United States Patent [19]

Scherman et al.

[11] Patent Number: 5,147,020

[45] Date of Patent: Sep. 15, 1992

[54] CONVEYOR ROLLER BRAKE

[75] Inventors: Dale Scherman; Jim Brown; Gary Carpenter, all of Jamestown, N. Dak.

[73] Assignee: Lucas Western Inc., Jamestown, N. Dak.

[21] Appl. No.: 716,276

[22] Filed: Jun. 17, 1991

[51] Int. Cl.⁵ .......................................... B65G 13/075
[52] U.S. Cl. ..................... 193/35 A; 188/83; 188/382
[58] Field of Search ............ 192/48.2, 48.5, 13 A; 193/35 A, 37; 198/784; 188/80, 83, 163, 382

[56] References Cited

U.S. PATENT DOCUMENTS

| | | | |
|---|---|---|---|
| 2,134,373 | 10/1938 | Parker | 193/35 |
| 2,590,994 | 4/1952 | McKay | 193/35 |
| 3,209,880 | 11/1965 | Dietiker | 193/37 |
| 3,312,320 | 4/1967 | Froio | 193/35 A |
| 3,321,057 | 5/1967 | DeGood | 193/35 |
| 3,498,417 | 3/1970 | Schmid | 188/80 X |
| 3,576,242 | 4/1971 | Mumma | 193/35 |
| 3,713,521 | 1/1973 | Moritake | 193/37 |
| 3,724,642 | 4/1973 | DeGood | 198/127 R |
| 3,789,960 | 2/1974 | Warren | 188/74 |
| 3,796,293 | 3/1974 | Warmann | 193/35 A |
| 3,899,063 | 8/1975 | Pollard | 193/35 A |
| 3,918,561 | 11/1975 | Isacsson | 193/35 A |
| 4,000,796 | 1/1977 | Bolten et al. | 193/35 A |
| 4,091,907 | 5/1978 | Tabler | 193/35 A |
| 4,099,601 | 7/1978 | Pittman | 188/163 |
| 4,600,093 | 7/1986 | Adams | 193/35 A |
| 4,809,836 | 3/1989 | Zilber | 193/35 A |

FOREIGN PATENT DOCUMENTS

| | | | |
|---|---|---|---|
| 1189917 | 3/1965 | Fed. Rep. of Germany | 193/35 A |
| 1246556 | 8/1967 | Fed. Rep. of Germany | 193/35 A |
| 1289779 | 2/1969 | Fed. Rep. of Germany | . |
| 2146020 | 4/1972 | Fed. Rep. of Germany | . |
| 2414983 | 10/1974 | Fed. Rep. of Germany | 198/784 |
| 3014608 | 10/1981 | Fed. Rep. of Germany | . |
| 1461923 | 11/1966 | France | . |
| 199648 | 11/1965 | Sweden | . |
| 1093606 | 12/1967 | United Kingdom | . |

*Primary Examiner*—Robert J. Oberleitner
*Assistant Examiner*—Alfred Muratori
*Attorney, Agent, or Firm*—Carothers and Carothers

[57] ABSTRACT

A conveyor roller brake that is preferably carried within the confines of a conveyor roller and includes a friction surface carried by the conveyor roller and a brake shoe that is maintained continuously in biased engagement with the friction surface and is selectively engageable for disengageable with respect to a nonrotatable hub element thereby selectively permitting the brake shoe to rotate freely with the conveyor roller in frictional engagement with the friction surface, or to be arrested in its rotation so that relative rotation of the roller with respect thereto provides continuous roller braking through frictional sliding of the brake shoe in biased engagement with the friction surface.

10 Claims, 1 Drawing Sheet

CONVEYOR ROLLER BRAKE

BACKGROUND OF THE INVENTION

In the roller conveyor arts, various sorts of braking structures for conveyor rollers are known and used for the purpose of controlling roller rotation. By retarding the free rotation of a conveyor roller with a brake, the movement of loads conveyed on the conveyor rollers can be controlled and manipulated in a desirable fashion. This may be especially advantageous in environments where very heavy conveyor loads which have considerable momentum when moving even very slowly on the conveyor rollers must be manipulated in close quarters. For example, in the loading and unloading of an aircraft cargo hold heavy unitized loads often must be moved quickly and efficiently within the cargo hold with minimum risk of injury to personnel or damage to the aircraft structure.

Regarding specifically the desirable attributes of conveyor rollers in an aircraft environment, conveyor rollers may commonly be mounted in the floor of an aircraft cargo hold to support cargo loads for easy and efficient handling thereof. Of course, effective conveyor roller braking is desirable in such an environment, but in addition the attributes of compact design, highly predictable reliability, and light weight all are most desirable for an aircraft cargo hold conveyor roller brake.

The prior art has contemplated a wide variety of brake structures for conveyor rollers, for example as disclosed in the following patent documents. U.S. Pat. Nos. 4,600,093, 3,796,293, 3,713,521, 3,321,057, 2,134,373, 2,590,994, 3,918,561, 3,576,242, 3,209,880, 3,789,960, 4,000,796, 4,809,836, 3,724,642, French patent 1,461,923, Swedish patent 199,648, German patents DE 30 14 608, 2,146,020 and 1,289,779, and British patent 1,093,606.

BRIEF SUMMARY OF THE INVENTION

In one presently preferred embodiment, the invention contemplates a novel and improved conveyor roller braking apparatus which includes a friction means that is non-rotatably carried with respect to a conveyor roller and has a radially inner, generally cylindrical friction surface formed coaxially with the axis of rotation of the conveyor roller. A braking shoe element is maintained continuously in biased engagement with the cylindrical friction surface and is non-rotatably retained with respect to a coaxially arranged first hub element so that in a non-braking or free running state the friction means, braking shoe and first hub element rotate in unison with the conveyor roller.

A second hub element is mounted coaxially with respect to the first hub element and non-rotatably with respect to the roller element, and is moveable axially with respect to the first hub element into or out of interlocking engagement therewith to selectively lock the first hub element in a rotatably stationary state with respect to the conveyor roller, or alternatively to permit the first hub element to rotate freely with the conveyor roller.

When the two hubs are interlocked so that both are rotatably stationary with respect to the conveyor roller, rotation of the conveyor roller is retarded by continuous braking action due to the continuous biased frictional engagement between the brake shoe and the friction surface.

Preferably the two hub elements are brought selectively to their mutually engaged and disengaged configurations through axial movement of one of the hub elements with respect to the other by action of an axial actuator such as an electric solenoid or other suitable actuator connected to the moveable hub for axial movement thereof in at least one axial direction. A compression spring or similar biasing means may be employed to continuously bias the axially moveable hub element in an opposed axial direction if the actuator positively imparts movement to the axially moveable hub in only one direction of axial movement. The actuator may be of relatively light duty construction because it does not have to directly provide the braking force, which is provided instead by the continuously biased engagement between the cylindrical friction surface and the brake shoe element.

Advantages of the invention include protection of the braking apparatus structural elements from environmental contamination, enhanced braking apparatus service life, simplified braking apparatus containment and installation, improved reliability of operation, and minimal actuator size and power requirements, together with the collateral advantages of compactness of minimal weight.

These and other embodiments and further advantages of the invention will be more readily appreciated upon consideration of the following detailed description and the accompanying drawings, in which.

Figure 1:
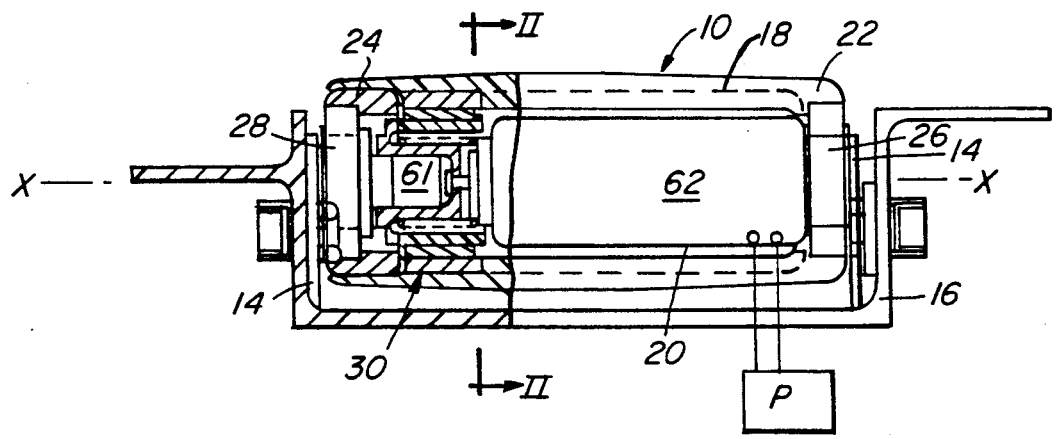
FIG. 1 is a sectioned side elevation of a conveyor roller including a braking apparatus according to one presently preferred embodiment of the instant invention.

There is generally indicated at 10 in FIG. 1 a conveyor roller apparatus which includes a roller assembly 12 that is mounted by means of mounting brackets 14 within a channel 16 that is carried, for example, in the floor of an aircraft cargo hold (not shown). The conveyor roller 10 may be one of many so mounted and used in the aircraft cargo hold to permit efficient manipulation of unitized loads, pallets, and other heavy loads within the aircraft cargo hold.

Concerning more specifically the roller structure, roller assembly 12 may include an elongated roller body assembly 18 of generally cylindrical form and having a hollow or open interior 20. The opposed axial ends 22, 24 of roller body assembly 18 are mounted in coaxially disposed ball bearing assemblies 26, 28, respectively, which are in turn carried by the mounting brackets 14 so that roller body assembly 18 is axially rotatable with respect to the mounting brackets 14 on an axis of rotation X—X in the known manner.

Figure 2:
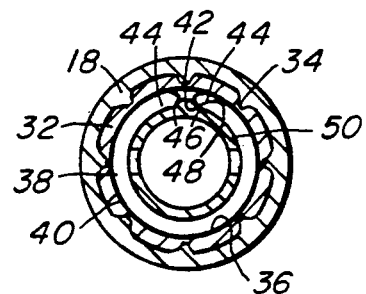
FIG. 2 is a sectional view taken on line II—II of FIG. 1.

Within the hollow interior 20 of roller body 18 is disposed a braking apparatus generally indicated at 30 and including a generally cylindrical friction pad 32 which is non-rotatably secured with respect to roller body 18 such as by interlocking engagement as indicated at 34 (FIG. 2). Friction pad 32 includes a radially inwardly facing, generally cylindrical surface 36 that is formed coaxially with the roller axis X—X. It will be noted here that references to cylindrical friction pad
} surfaces and corresponding brake shoe surfaces are intended to include surfaces having only a partial cylindrical extent rather than a full 360° extent in the circumferential direction.

Friction surface 36 encompasses a friction shoe element 38 which may be a formed spring ring having a radially outer cylindrical surface 40 that is maintained continuously in biased engagement with friction surface 36 by virtue of a radially outward spring bias of spring ring 38. That is, the outer diameter of spring ring 38 in its undeformed state is slightly larger than the diameter of friction surface 36 such that when spring ring 38 is compressed generally in the radial direction to fit within the confines of surface 36, its tendency to resile to an undeformed state continuously maintains surfaces 36 and 40 in mutually biased engagement under the bias of the deformed spring ring 38.

In order to permit the requisite radial spring deformation, spring ring 38 includes a peripheral gap 42 of sufficient width to allow the adjacent, circumferentially opposed portions 44 of spring ring 38 to approach one another upon radial deformation of the spring ring 38 as above described. The opposed portions 44 preferably also are inturned as shown so that free edge portions thereof will not contact friction surface 36 thereby preventing excess wear of surface 36 through gouging or scraping. The inturned ends 44 of spring ring 38 also serve to engage the spring ring 38 with a hub member as described hereinbelow.

A generally cylindrical locking hub 50 is disposed coaxially within spring ring 38 in non-rotatable relation with respect thereto by virtue of engagement of the inturned spring ring end portions 44 with cooperating portions of locking hub 50 as follows. Locking hub 50 includes a pair of circumferentially spaced flats 46 formed on a radially outer surface thereof adjacent the circumferentially opposed sides of an intervening projection 48. Spring ring end portions 44 cooperably engage the flats 46 and the projection 48 to nonrotatably interlock spring ring 38 with hub 50.

Hub 50 also includes an annular flange portion 52 which projects radially outwardly adjacent one axial end thereof and is captured intermediate axially adjacent elements such as portions of roller end portion 24 and friction pad 32. The hub 50 is thereby retained axially with respect to roller body 18 and friction pad 32. Flange 52 is not tightly captured as it is necessary that locking hub 50 be free for rotation with respect to roller body assembly 18 when the braking apparatus according to this invention is engaged.

Hub 50 may include another flange portion 53 projecting radially outwardly adjacent the opposed axial end thereof such that the flanges 52 and 53 serve to axially capture spring ring 38 therebetween.

A generally cylindrical interface hub 54 is disposed coaxially with respect to locking hub 50 and extends at least partially therein, the interface hub 54 being slideable axially with respect to locking hub 50 for selective engagement and disengagement of interlocking engagement elements 56 and 58 of the respective hubs 54 and 50. For example, interface hub 54 may include a plurality of radially projecting cog elements 56 which are engageable within cooperable, axially adjacent open slots 58 formed in locking hub 50. Accordingly, upon axial movement of interface hub 54 toward locking hub 50 the respective elements 56, 58 move into mutually interlocking engagement to prevent rotation of the hubs 50 and 54 with respect to each other.

Interface hub 54 is carried by a generally cylindrical axial extension portion 60 that is rigidly mounted with respect to one of the mounting brackets 14 and projects axially therefrom within roller body 18. Extension 60 includes axially extending splines, a key slot, wrench flats, or similar structure such as shown at 61 for engagement with cooperating structure 63 of interface hub 54. The engagement of elements 61 and 63 precludes axial rotation of hub 54 with respect to extension 60 while permitting the hub 54 to slide axially on the extension 60 with respect to locking hub 50. This axial sliding capability of hub 54 permits the selective engagement and disengagement of the interlocking elements 56 and 58 of the hubs 54 and 50 as above described.

For axial movement of hub 54 to and fro with respect to hub 50, a suitable actuator or motive means is provided, for example, an electric solenoid 62 disposed coaxially within the interior 20 of roller body assembly 18 and mounted by any suitable fastener means (not shown) on the mounting bracket 14 opposite that from which extension 60 projects. Solenoid 62 includes an electrically operable, axially moveable plunger 64 which projects axially through a coaxial opening 66 in an adjacent end surface 65 of interface hub 54.

Figure 3:
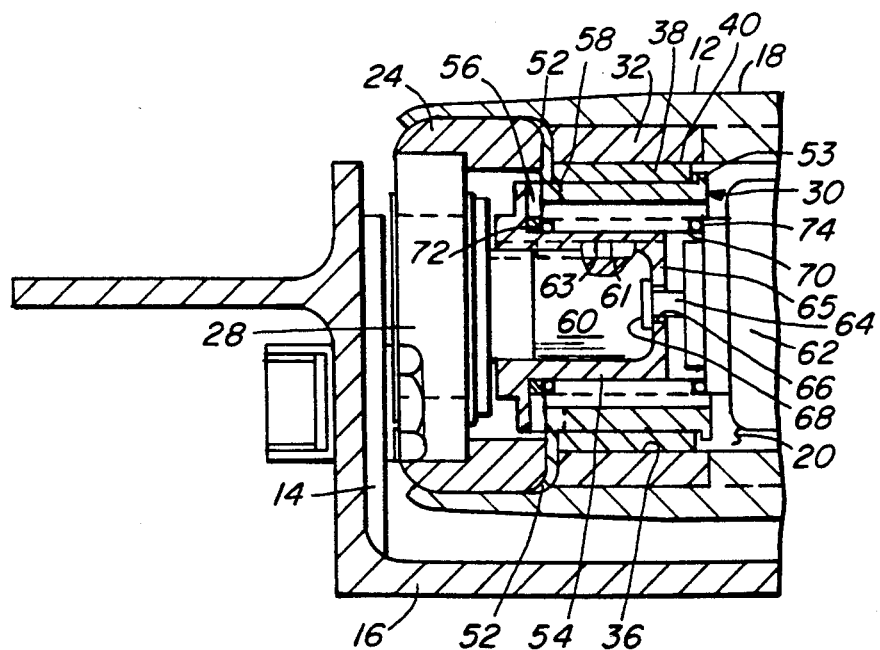
FIG. 3 is an enlarged fragmentary portion of FIG. 1 showing the braking apparatus of the present invention in greater detail.

A suitable fastener or similar element provides a flanged head portion 68 for plunger 64 whereby axially confronting surface portions of head 68 and the cooperating hub end surface 65 are engageable for one-way actuation of interface hub 54 in axial movement. That is, on actuation of solenoid 62 by a suitable, conventional power source P, the plunger 64 is drawn axially to the right as shown in FIGS. 1 and 3 thereby pulling interface hub 54 axially to the right on extension 60 and interengaging the interlocking elements 56 and 58 thereby rotationally interlocking the hubs 50 and 54. In an alternative embodiment element 62 could be a hydraulic actuator powered by a hydraulic power source P. Since hub 54 is non-rotatably secured with respect to the rigidly mounted extension 60, locking hub 50 and spring ring 38 now are also rigidly secured against axial rotation. Accordingly, continued rotation of roller body 18 and the friction pad 32 carried thereby produces a continuous, uniform friction braking action by frictional sliding of surfaces 36 and 40 one on the other as above described.

Upon release of solenoid 62, the axial actuating force applied to plunger 64 is relieved and interface hub 54 is free to move axially to the left for disengagement from locking hub 50; however, without some actuating impetus, the interface hub 54 may tend to remain in interlocked engagement with hub 50. Accordingly, a return spring, for example a helical or coil spring 70, extends coaxially of interface hub 54 and has end portions thereof in engagement with axially opposed, confining surfaces 72 and 74 of interface hub 54 and solenoid 62, respectively.

Spring 70 is maintained in a compressed or axially biased state at least when compressed by movement of interface hub 54 into interlocked engagement with hub 50 as above described to thereby provide an axial return bias urging interface hub 54 toward the leftward or disengaged position with respect to hub 50. Preferably, spring 70 is compressed throughout the range of available axial movement of interface hub 54. That is, under all operating conditionsa preload compression of spring 70 maintains a continuous return bias on interface hub 54 to continuously bias interface hub 54 toward its extreme leftward or disengaged position with respect to locking hub 50.

From the above description it will be seen that the present intention provides a reliable and efficient conveyor roller braking apparatus of compact and simple design which provides uniform, continuous braking action for the roller upon actuation thereof, or alternatively permits free running or unbraked conveyor roller operation when not actuated, and in which the brake actuator may be of extremely light duty construction and power requirements in comparison to the braking force developed since the actuator is not required to carry any of the loads which provide the roller braking. The brake friction pad and shoe are continuously engaged in biased frictional engagement but the shoe is free to rotate with the friction pad when the conveyor roller is in a free running state and the brake is disengaged. The brake shoe selectively constrained against rotation by engagement of its carrier, the locking hub, with a nonrotatable element, the interface hub, when it is desired to actuate the brake. Thus, when the brake is engaged rotation of the roller and friction pad with respect to the brake shoe produces a continuous, uniform friction braking action.

Notwithstanding the description hereinabove of certain presently preferred embodiments of the invention, it is to be understood and appreciated that the invention may be practiced in numerous alternative and modified embodiments without departing from the broad spirit thereof. For example, solenoid 62 may be substituted by any alternative, suitable actuator such as a hydraulic piston and cylinder assembly or other mechanical actuator; the specific geometry of interlocking elements for interlocking engagement of hubs 50 and 54, as well as for the nonrotatable engagement of hub 54 on extension 60 may be chosen within a wide design latitude consistent with accepted design practice and the functional or operational objectives set forth hereinabove; the selective engagement and disengagement of the brake may be effected by axial movement of either hub with respect to the other. Furthermore, the disclosed braking apparatus will operate to provide suitable braking force, although without the degree of compactness or protection from environmental contamination of the disclosed embodiments, if the braking apparatus is carried externally of the conveyor roller.

These and other embodiments and modifications having been envisioned and anticipated by the inventors, it is intended that the invention should be construed broadly and limited only by the scope of the claims appended hereto.

We claim:

1. A braking apparatus for selectively braking the axial rotation of a conveyor roller comprising:
   a friction means coaxially and nonrotatably disposed with respect to such a conveyor roller and having a generally cylindrical friction surface means disposed coaxially with respect to such a roller;
   brake shoe means disposed for coaxial rotation with respect to such a conveyor roller radially adjacent said friction surface means;
   said brake shoe means including a generally cylindrical shoe surface portion which is maintained in continuously biased frictional engagement with said friction surface means and a first hub means disposed coaxially with respect to said shoe surface portion;
   second hub means carried coaxially with respect to such a roller;
   means nonrotatably constraining said second hub means with respect to such a roller;
   said first and second hub means including mutually cooperable interlocking means which are selectively interengageable to nonrotatably constrain said first and second hub means with respect to each other; and
   selectively operable actuator means cooperably associated with one of said first and second hub means to move said one of said first and second hub means with respect to the other of said first and second hub means to move said interlocking means selectively into and out of interengagement for selectively constraining and releasing said first hub means for rotation with respect to said second hub means.

2. The braking apparatus as set forth in claim 1 wherein said second hub means is axially moveable with respect to said first hub means and said actuator means is operable to axially move said second hub means for moving said interlocking means axially into and out of interengagement.

3. The braking apparatus as set forth in claim 1 wherein said brake shoe means includes a generally cylindrical spring ring which is encompassed by said friction means and is maintained in radially biased engagement with said friction surface means.

4. The braking apparatus as set forth in claim 1 additionally including disengagement means cooperable with said one of said hub means to continuously urge said one of said hub means toward a position whereat said interlocking means are disengaged.

5. The braking apparatus as set forth in claim 4 wherein said disengagement means includes spring bias means continuously biasing said one of said hub means axially toward a disengaged position with respect to the other of said hub means.

6. The braking apparatus as set forth in claim 1 wherein said actuator means is an electrically operable solenoid means.

7. The braking apparatus as set forth in claim 1 wherein said actuator means is a hydraulically operable actuator means.

8. The braking apparatus as set forth in claim 1 wherein said actuator means is a mechanically operable actuator means.

9. The braking apparatus as set forth in claim 1 wherein said first hub means is disposed radially inwardly of said friction surface means and said second hub means is disposed radially inwardly of said first hub means.

10. In a conveyor apparatus with conveyor rollers and braking apparatus for selectively permitting the conveyor rollers to rotate freely or to rotate under a condition of continuous roller braking, the combination comprising:
   an elongated, generally cylindrical conveyor roller having an interior space extending axially thereof intermediate the axial ends of said roller;
   a braking apparatus received within said space;
   said braking apparatus comprising a friction means coaxially and nonrotatably disposed with respect to such a conveyor roller and having a generally cylindrical friction surface means disposed coaxially with respect to such a roller;

first hub means disposed for coaxial rotation with respect to such a conveyor roller radially inwardly adjacent said friction surface means;

brake shoe means nonrotatably affixed with respect to said first hub means radially intermediate said first hub means and said friction surface means, and including a shoe surface which is maintained in continuously biased frictional engagement with said friction surface means;

second hub means carried coaxially with respect to such a roller;

means nonrotatably constraining said second hub means with respect to such a roller;

said first and second hub means including mutually cooperable interlocking means which are selectively interengageable to nonrotatably constrain said first and second hub means with respect to each other; and selectively operable actuator means cooperably associated with one of said first and second hub means for moving said one of said hub means with respect to the other of said hub means to engage and disengage said interlocking means for respectively constraining and releasing said first and second hub means for rotation with respect to each other.

* * * * *